UNITED STATES PATENT OFFICE.

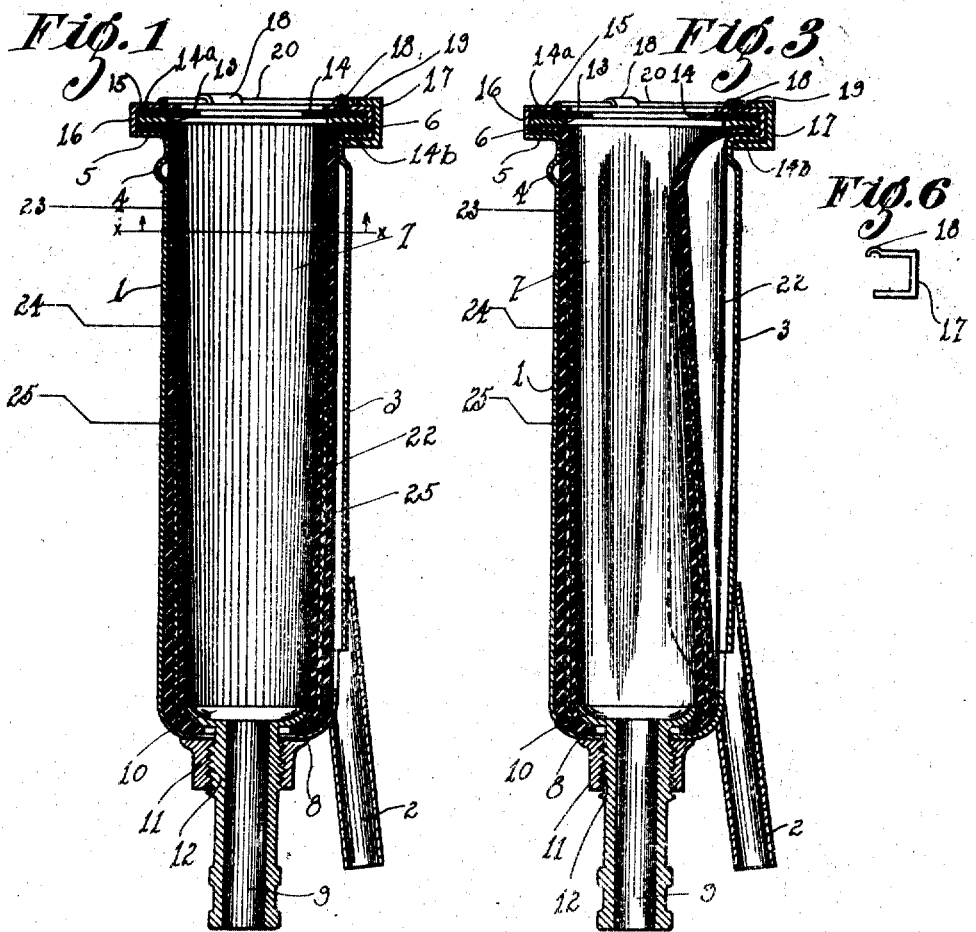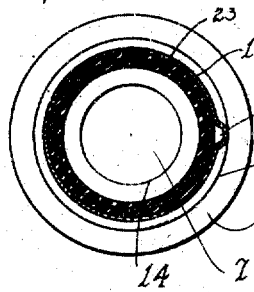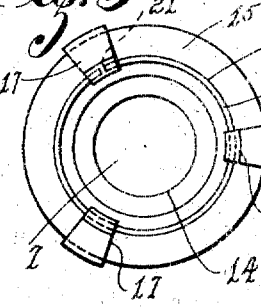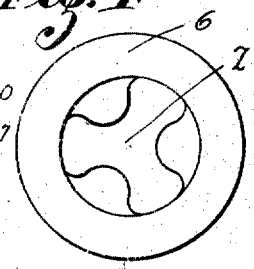

HERMAN A. KRICKE, OF CROWS LANDING, CALIFORNIA.

TEAT-CUP.

1,231,748.

Specification of Letters Patent.

Patented July 3, 1917.

Application filed May 20, 1916. Serial No. 98,790.

*To all whom it may concern:*

Be it known that I, HERMAN A. KRICKE, a citizen of the United States, residing at Crows Landing, in the county of Stanislaus, State of California, have invented certain new and useful Improvements in Teat-Cups; and I do declare the following to be a full, clear, and exact description of the same, reference being had to the accompanying drawings, and to the characters of reference marked thereon, which form a part of this application.

This invention relates to improvements in teat cups used in connection with milking machines and is particularly adapted for use in connection with a type of milking machine shown in the patent to Sharples, Number 1014671, being the type wherein there is an alternate pressure and suction against the teat. My improved cup is likewise especially designed for use in connection with the automatic vacuum control means set forth in my application Serial Number 90,281, filed April 10th, 1916, and the control valve shown in my application Serial Number 16,877, filed March 25th, 1915.

The main object of my invention is to provide a teat cup for coöperation with the above entitled structures which will have a three point squeezing contact with the teat, which squeezing contact will be commenced against the top of the teat and gradually continued downwardly along the length of the same, such squeezing being made of course prior to the suction against the teat occasioned by the vacuum control means indicated above.

I further aim to produce a teat cup of a much better arrangement than those now commonly used and one which has various means for overcoming the disadvantages and difficulties encountered by teat cups now commonly used. By having the three point pressure in performing the squeezing operation this gives an evenly divided and effective squeezing along the length of the teat which is much better than the one-sided squeeze now common in those teat cups which squeeze from the top to the bottom of the teat. My improved squeezing operation will be much more like the natural hand milking operation than can be produced by any teat cup now in use.

A still further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a sectional view of the teat cup complete.

Fig. 2 is a sectional view on a line X—X of Fig. 1.

Fig. 3 is a sectional view of the teat cup showing the elastic pressure tube in the position it would assume just as the pressure was first applied to it, the dotted lines showing the position which it would assume after it had made its complete squeezing movement.

Fig. 4 is a top plan view of the squeezing tube showing how it appears when it is making the three point squeeze.

Fig. 5 is a top plan view of the complete teat cup.

Fig. 6 is a detached view of the retaining clip.

Referring now more particularly to the characters of reference on the drawing, the numeral 1 designates the outer metallic casing of the teat cup communicating with which is the pressure pipe 2, the casing 1 having a longitudinal groove 3 coöperating with the pipe 2 and terminating in an annular groove 4 in the upper end of the casing 1.

The casing 1 has an outwardly projecting annular flange 5 at its upper end adapted to receive the flange 6 on the inner elastic tube 7, such tube 7 likewise having at its lower end an inwardly projecting annular flange 8.

The numeral 9 designates the vacuum or suction tube which has on its upper end a retaining flange 10 which extends within the tube 7 and is adapted to clamp the flange 8 against the bottom of the casing 1, this clamping operation being performed by a lock nut 11 mounted on the threaded portion 12 of the tube 9 and bearing against the bottom of the said casing 1 to draw the flange 10 against the flange 8 to make a tight joint.

A metal washer 13 rests on the top face of the flange 6 and a central orificed disk 14 rests on the top of the washer 13, the diameter of the orifice of the disk 14 being less than the diameter of the tube 7 and washer 13 for the purpose of engaging the upper edge of the teat in order to hold the teat cup in position. The members 5, 6, 13 and 14 are all clamped together in the following manner, viz:

The numeral 15 designates a central orificed washer having a downwardly projecting flange 16 on its edges. This flange 16 laps over and incloses the parts 5, 6, 13 and 14 and is clamped in that position by means of small channel-shaped clips 17 which fit around the parts 5, 16 and 15 as shown. The inner edges of the top sides of these members 17 are provided with small half round grooved flanges 18. In the top surface of the member 15 is a half round annular groove 19. When the parts 17 are clamped over the parts as shown the grooved members 18 aline with the groove 19 and a round wire 20 is then turned into said grooves with its free ends, as at 21, terminating under one of the members 17. This ring 19 then acts to lock the members 17 to the member 15 and these members 17 hold all the described parts clamped together as is apparent.

The flange 6 of the inner elastic tube 7 will have a layer of fabric 14$^b$ molded therein which will act as a stiffening member for said flange.

Over the face of the groove 3 I provide a small wire cloth mesh screen or strip 22 which is clamped under the flange 16 at its upper end and under the flange 8 at its lower end. As will be noted the tube 7 normally fits closely within the casing 1 and the purpose of this member 22 is to hold it in this close fitting position and prevent it from wrinkling or becoming extended into the groove 3. The mesh of this member 22 does not prevent air pressure from passing through the same for a purpose as will be noted.

The sides of the tube 7 have an enlarging taper from the upper to the lower end of such tube and for a short distance from the upper end the said tube 7 is made of plain elastic rubber with no reinforcement, this plain part being immediately adjacent the groove 4. Slightly below the groove 4 I reinforce the tube 7 with one lamination 23 of fabric or other suitable reinforcing material and farther down I provide another lamination 24 and still farther down another lamination 25. The enlarged taper of the tube coöperating with these increased laminations of reinforcing fabric tend to stiffen the sides of the tube 7 gradually from the upper to the lower ends thereof. When the air pressure is admitted through the tube 2 and groove 3 it will therefore first influence the tube 7 at the most elastic point immediately adjacent the groove 4. By reason of this groove 4 and the relative diameter of the tube 7 the air pressure will act first directly against the tube 7 adjacent the groove 3 and will split and proceed equally on each side of the groove 3 through the groove 4. This causes three equal points of pressure against the tube 7 which will cause it to squeeze inwardly at three points as shown clearly in Fig. 4.

As indicated above the pressure first comes at the most flexible point of the tube 7 which is at the upper end and will then gradually work down along the length of said tube. This will be a very evenly distributed pressure commencing at the top and extending downwardly and controlled by the relative resistance of the sides of the tube due to its reinforcement described. The action of the squeezing of the tube 7 against the teat will effect a complete inclosure of the teat adjacent the groove 4 whereupon the controlling plunger in the automatic shut-off valve for the vacuum line will open and allow the milk to be squeezed and drawn from the teat into the bucket. The squeezing operation and this suction being completed the pressure will then be relieved from the tube 2 and thereupon the plunger in the automatic shut-off valve will close and suction will be applied to the tube 2. This will then cause the flexible tube 7 to be drawn back to normal position closely fitted in the casing 1, as described.

It is of course understood that the interior of the tube 7 is held distinctly isolated from the interior of the casing 1 by means of the clamps at each end as first described. The disk 14 is provided for a part of its diameter, the width of the metal washer 13, with a reinforcing fabric 14$^a$ to prevent it from crinkling when clamped down in the manner shown and the under face of the washer 15, both faces of the washer 13, and the top face of the flange 5 are all slightly serrated to grip the rubber parts to prevent them from crinkling or rolling when clamped into position. This is to insure all the parts being truly fitted in the proper position.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A teat cup comprising an outer casing provided with a longitudinal groove in its side terminating in an annular groove near the upper end thereof, a tube communicating with the longitudinal groove, and an elastic tube fitted into the casing and clamped at both ends to isolate the interior of the elastic tube from the interior of the casing, and a tube communicating with the lower end of the elastic tube.

2. A teat cup comprising a casing having a pressure inlet, an elastic tube fitted within the casing and having an outlet, such tube having a reinforcement commencing at a point below its upper end and gradually increasing in strength toward the lower end thereof.

3. A teat cup comprising a casing having an inlet communicating with a longitudinal groove, such groove terminating in an annular groove near the upper end of the casing, an elastic tube fitted within the casing, a reinforcement arranged within the elastic tube at a point below such annular groove and gradually increasing in strength toward the lower end of the elastic tube, such elastic tube being provided with an outlet.

4. A teat cup comprising a casing having an inlet communicating with a longitudinal groove, a porous strip fitted over the longitudinal groove, and an elastic tube fitted in the casing and having an outlet.

In testimony whereof I affix my signature.

HERMAN A. KRICKE.